United States Patent
Biran et al.

(10) Patent No.: US 8,516,495 B2
(45) Date of Patent: Aug. 20, 2013

(54) DOMAIN MANAGEMENT AND INTEGRATION IN A VIRTUALIZED COMPUTING ENVIRONMENT

(75) Inventors: Ofer Biran, Haifa (IL); Erez Hadad, Nahariya (IL); Richard Edwin Harper, Chapel Hill, NC (US); Elliot K. Kolodner, Haifa (IL); Yosef Moatti, Haifa (IL); Lorrie A. Tomek, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 12/963,646

(22) Filed: Dec. 9, 2010

(65) Prior Publication Data

US 2012/0151474 A1    Jun. 14, 2012

(51) Int. Cl.
*G06F 9/46* (2006.01)
*G06F 9/455* (2006.01)
*G06F 9/30* (2006.01)
*G06F 15/16* (2006.01)

(52) U.S. Cl.
USPC .............. 718/106; 718/1; 718/100; 718/101; 718/102; 712/216; 709/204; 709/205

(58) Field of Classification Search
None
See application file for complete search history.

(56) References Cited

U.S. PATENT DOCUMENTS

| | | | |
|---|---|---|---|
| 7,917,617 B1 * | 3/2011 | Ponnapur et al. | 709/224 |
| 2008/0295096 A1 | 11/2008 | Beaty et al. | |
| 2009/0070771 A1 * | 3/2009 | Yuyitung et al. | 718/105 |
| 2009/0293022 A1 | 11/2009 | Fries | |
| 2010/0005465 A1 * | 1/2010 | Kawato | 718/1 |
| 2010/0122261 A1 | 5/2010 | Karo | |
| 2010/0161805 A1 * | 6/2010 | Yoshizawa et al. | 709/226 |
| 2010/0250744 A1 * | 9/2010 | Hadad et al. | 709/226 |
| 2012/0078961 A1 * | 3/2012 | Goenka | 707/778 |

OTHER PUBLICATIONS

Nguyen Van Hien, "Autonomic virtual resource management for service hosting platforms".
Borja Sotomayor et al., "An Open Source Solution for Virtual Infrastructure Management in Private and Hybrid Clouds", IEEE Internet Computing, Special Issue on Cloud Computing, Jul. 7, 2009.
Ignacio M. Llorente, "A Flexible and Interoperable Cloud Operating System", Jan. 13, 2010.

* cited by examiner

*Primary Examiner* — Diem Cao
*Assistant Examiner* — Adam Lee

(57) ABSTRACT

Systems and methods for domain management in a virtualized computing environment are provided. In one embodiment, the method comprises collating advice received from one or more domain advisors connected in the virtualized computing environment; resolving any conflicts among the advice received from said one or more domain advisors; utilizing the collated advice to generate a placement plan comprising a plurality of operations for virtual machines in said virtualized computing environment; and executing the one or more operations in the placement plan, wherein one or more domain handlers may be called to update the virtualized computing environment before, during or after execution of one or more operations from among said plurality of operations in the plan.

20 Claims, 8 Drawing Sheets

DOMAIN MANAGEMENT AND INTEGRATION IN A VIRTUALIZED COMPUTING ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to optimizing the deployment and placement of virtual machines in a network environment according to constraints and goals defined by various management domains.

BACKGROUND

In some computing networks, shared resources are provided, on demand, to computing systems and other devices connected to the network by way of deploying one or more virtual machines (VMs). A VM generally runs as a software application and supports services that provide a platform-independent programming environment that abstract away details of the underlying hardware or operating system for the party requesting the respective services.

VMs may be provisioned by a management layer (e.g., Infrastructure as a Service (IaaS)) that is centrally implemented as a part of the network architecture. Optimizing and orchestrating the provisioning and placement of VMs on a cluster of physical servers or hosts is generally critical to the efficient use of the available resources in the network. Particularly, in light of the growing number of system management domains (e.g., performance, availability, security, financial and administrative domains) the location of placement and deployment of various VM resources are further scrutinized.

Accordingly, there is a growing need for an open, extensible, scalable, and high-quality placement and deployment system to manage one or more commonly-occurring events in a virtualized computing environment. Such events include, for example, the deployment of new VMs into a cluster of hosts, update or removal of existing VMs, addition or removal of host machines to host clusters, timely response to host failures, host predicted failure or scheduled host outage, administration of user directed migration and validation of suitability of a host for a VM placement, and periodic replacement of VMs or hosts for maintaining various domain goals enhance performance and preserve energy.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for domain management in a virtualized computing environment comprises collating advice received from one or more domain advisors connected in the virtualized computing environment; resolving any conflicts among the advice received from said one or more domain advisors; utilizing the collated advice to generate a placement plan comprising a plurality of operations for virtual machines in said virtualized computing environment; and executing the one or more operations in the placement plan, wherein one or more domain handlers may be called to update the virtualized computing environment before, during or after execution of one or more operations from among said plurality of operations in the plan.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
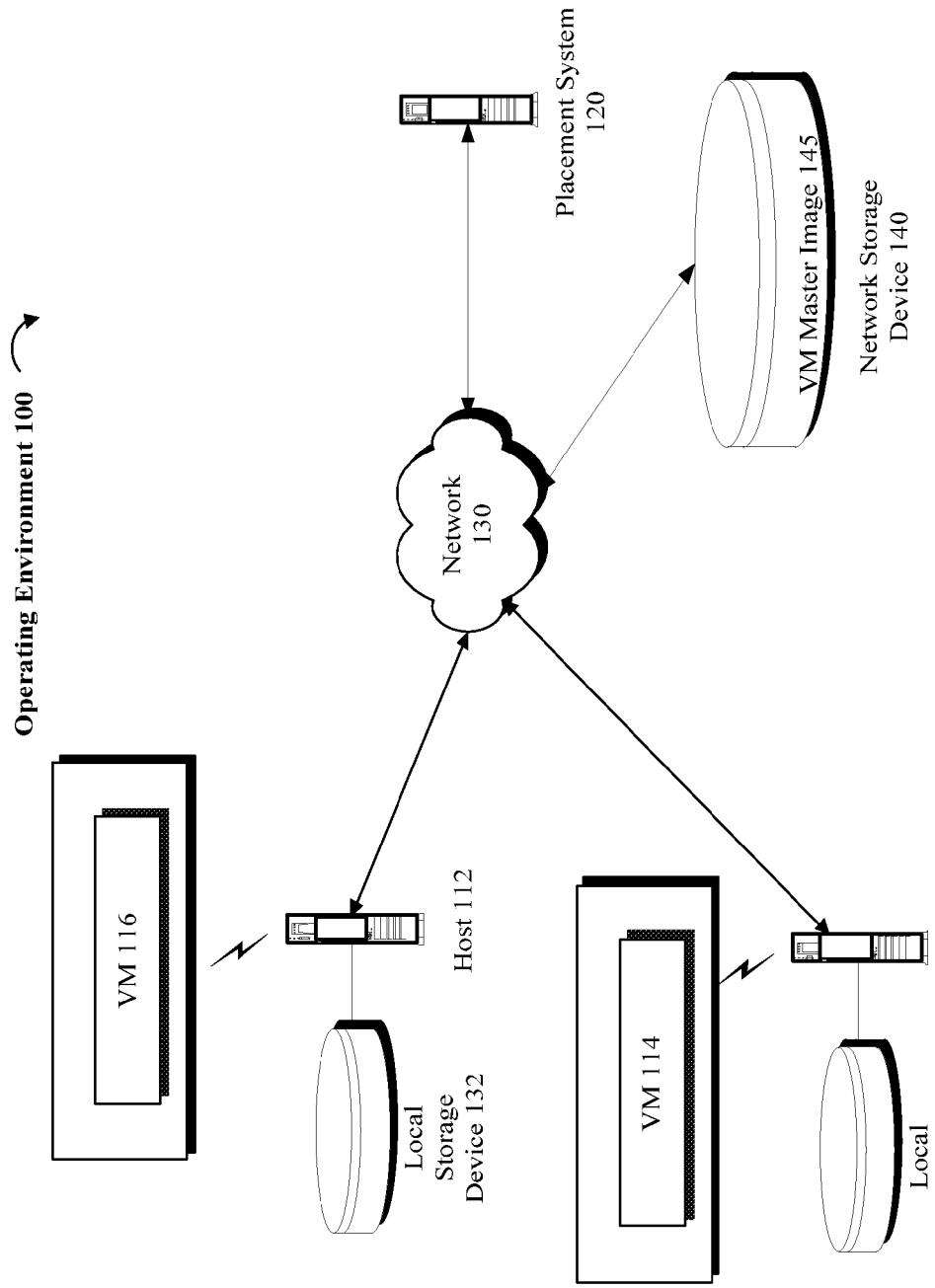
FIGS. 1 and 2 illustrate exemplary operating environments in accordance with one or more embodiments, wherein a placement system is utilized to monitor and manage placement of VMs in a virtualized network environment.

Referring to FIG. 1, an exemplary operating environment 100 is illustrated, wherein a placement system 120 is in communication with a cluster of hosts (e.g., hosts 110, 112) by way of network 130. Placement system 120 may be implemented centrally or in a distributed fashion, for example, over a platform that supports Infrastructure as a Service (IaaS)) as a part of the network architecture to provision one or more virtual machines on one or more host systems. IaaS delivers computing infrastructure (e.g., a platform virtualization environment) as a service.

Depending on implementation, placement system 120 may manage the storage of a VM master image 145 on a network storage device 140, where said VM master image 145 may be utilized for the applications (i.e., services) that are to be provisioned by way of executing VM 114 on host 110, for example. In one embodiment, host 110 may download VM master image 145 to a local storage device 130 from network storage device 140 and deploy VM 114 to service the respective service requests.

Figure 2:
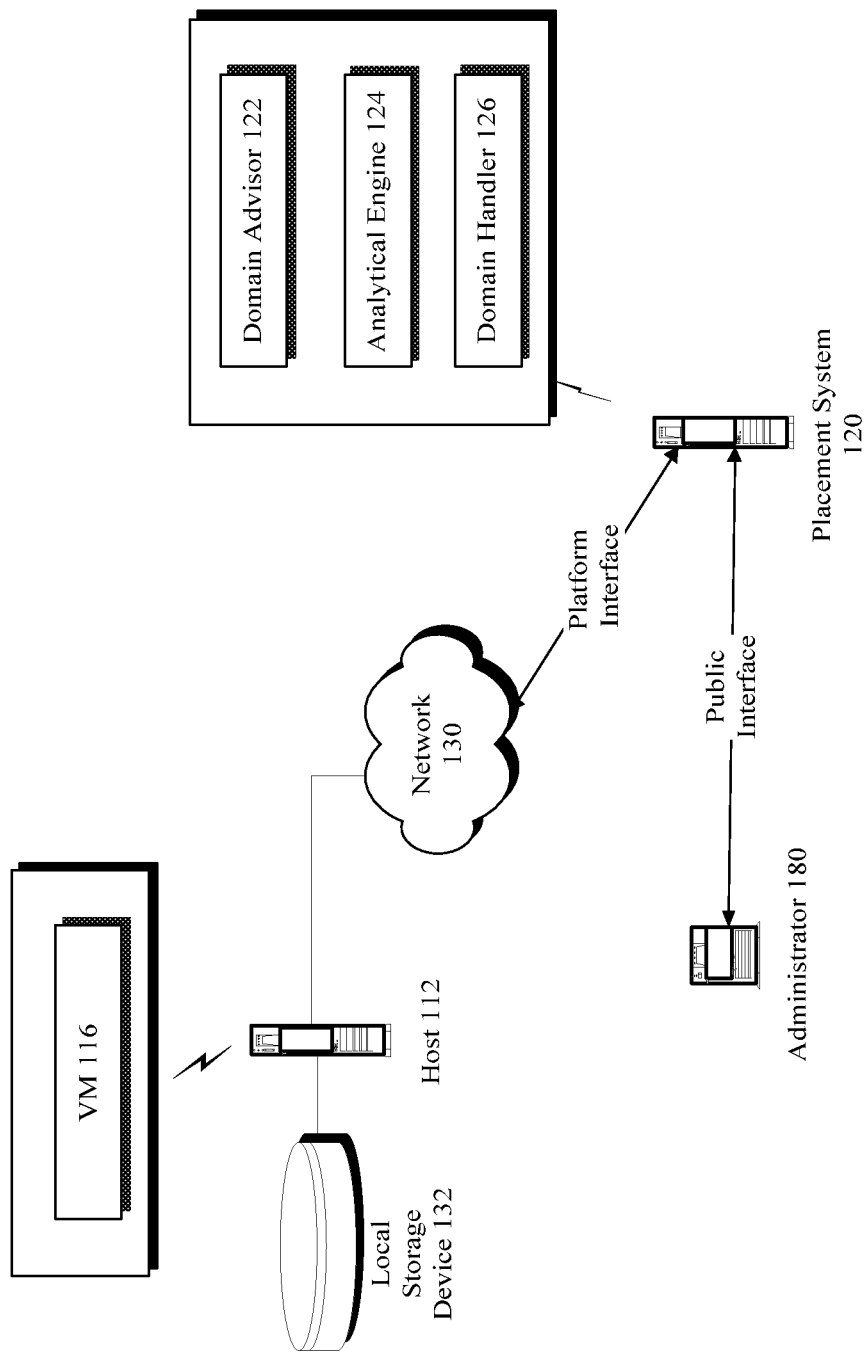

Referring to FIG. 2, the placement system 120 may comprise a domain advisor 122, an analytical engine 124, and a domain handler 126, in accordance with one embodiment. Placement system 120 may communicate with, for example, an administrator system 180 via a public interface, either directly or over a network 130. One or more hosts or VMs may be connected to placement system 120 by way of a platform interface either directly or over network 130, depending on implementation.

In one embodiment, placement system 120 is configured to implement an open and extensible placement system which provides a placement computation and orchestration with the following capabilities: (1) a uniform representation of the problems and solutions in a virtualized environment with respect to the capabilities of the hosts and the placements of the VMs, and (2) conforming to advice provided by one or more domain advisors or managers with respect to the abstraction of a constraint or a preference or a goal.

Multiple domain managers may be integrated into a placement computation and placement orchestration process. The placement system 120, for example, may provide a pluggable interface for registration of one or more domain managers. Domain managers may be registered as domain advisors 122, domain handlers 126 or both. A domain advisor 122 provides placement constraints or goals related to its domain as abstracted by a uniform advice, for example. A domain handler 126 may be called before, after or during a placement plan execution (e.g., before and after each step) to allow a domain to apply any changes that are needed.

Figure 3:
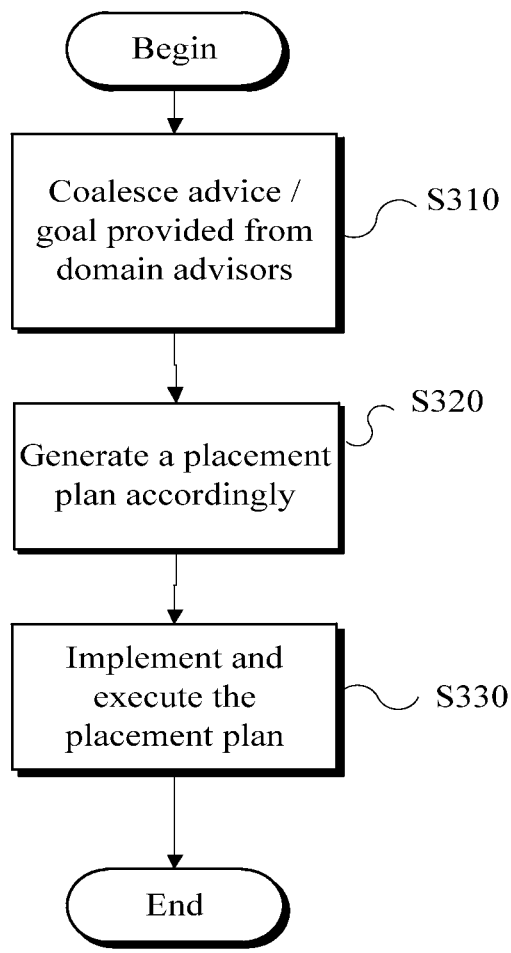
FIG. 3 illustrates a flow diagram of a method for collating information provided by domain advisors and determining a suitable placement plan for the VMs, in accordance with one or more embodiments.

Referring to FIG. 3, placement system 120 may be configured to coalesce advice or goal information provided from the domain advisors 122 (S310) and use analytical engine 124 to generate a placement plan for the respective VMs that can satisfy the related goals or constraints (S320). Thereafter, the domain handlers 126 may be called during the execution of the placement plan generated by the analytical engine 124 (S330). In some embodiments, placement system 120 is configured to resolve potentially conflicting advice received from various domain advisors 122.

The public interface may provide a variety of systems management components for a variety of uses. Further, the public interface may provide access to the analytical engine so that placement system 120 may be upgraded with better and potentially different analytical engines as needed. One or more embodiments provide an open architecture for placement computation and execution with the ability to integrate new domain managers and placement optimization and orchestration algorithms in a standard way, and for enforcing domain constraints, expressing domain goals, and performing domain related operations during placement plan execution.

A placement plan generated by the analytical engine 124 satisfies constraints from various management domains, and may optimize goals related to other domains (e.g., performance, energy consumption, cost, etc.). Exemplary constraints and domains may include: (1) resource requirements for a VM (e.g., assuring that each virtual machine gets at least the minimal required resources, such as CPU, memory, network, storage, hardware specific capability that it needs), (2) security and isolation (e.g., assuring that virtual machines of certain customers with a conflict of interest, or business conflict do not reside on a same host for the purpose of security and confidentiality), (3) availability of VMs such that, for example, virtual machines that are backups of each other do not reside on the same host, or the same site, and (4) energy (e.g., utilize no more than a certain number of physical servers or electricity).

In certain embodiments, different management domains may have conflicting interests and such conflicts are properly reconciled by the analytical engine 124 after the consideration of the related constraints and factors reported by the domain advisors 122. Moreover, as customer's needs change and new industry and technical developments occur, new management domains and concerns, and new algorithms for calculating an optimal placement, may be provided to the placement system 126, to keep the analytical engine up-to-date.

The implementation of an optimized valid placement, in one embodiment, involves the generation of a plan to move the system from a current placement to the computed placement. The generated plan may call for a series of steps, where each step causes the manipulation of the placement of one or more VMs, such as relocating the VMs, suspending/resuming VMs, creating/removing VMs, and re-allocating resources, for example. The plan implementation may also call for the management and overseeing of the proper ordering or sequencing of placement changes in the plan, when certain constraints are to be maintained according to a placement change.

For example, the plan may provide that certain constraints are not to be violated, either temporarily or permanently (e.g., the plan may provide that a host's resources are not to be overloaded while VMs are relocated to and from that host). The resulting plan's execution may in turn involve consultation with, and activity by, various management domains, where taking certain configuration actions may be needed. For example, the networking may need to be reconfigured before or after a relocation step is performed. Thus, a placement plan may be implemented in a way that the intermediate steps of the placement plan also meet certain management domain guidelines.

Accordingly, in one or more embodiments, placement system 120 is implemented to support an open and extensible system where new domain managers may be plugged in and participate in a standard scheme, by way of providing the respective domain constraints or goals, and also participate in the execution of the placement plan for applying system changes related to their domain. Existing solutions do not offer the ability to coalesce placement advices from multiple domain managers.

Placement system 120 is also configured to offer a public interface that allows its usage by a variety of systems management components for a variety of uses and to support the export of a common interface to the analytical engine 124. In this manner, the placement solution may be upgraded or replaced as needed. It is noteworthy that the methods and systems described in this disclosure are applicable to many types of placement problems in which resources are placed in containers (e.g., hosts) according to constraints from various domains.

In the following the above disclosed concepts, processes and implementations are discussed in further detail with reference to specific embodiments and methodologies that are common to virtualization in a computing environment and particularly as applicable within the context of cloud computing. It is noteworthy, however, that the disclosed embodiments here are exemplary and in no event should be construed as limiting the scope of the claimed subject matter to particular exemplary embodiments.

In one exemplary embodiment, placement system 120 comprises a placement system 120 (hereafter also referred to as an orchestrator (POR)) which orchestrates the computation and execution of placement plans. The POR constructs the placement problem by collecting the environment from the platform interface and coalescing the advice from one or more domain advisors 122. Analytical engine 124 is used to compute the desired placement, defined as a mapping of one or more VMs to one or more hosts according to resource allocations needs of each VM.

The analytical engine 124 may be realized by a general purpose constraints satisfaction solver, or any proprietary optimization engine. The POR computes the placement plan according to the analysis performed by the analytical engine 124. A placement plan, in one implementation, may define a series of steps, where a step may be a relocate step to relocate one or more VMs from a source host to a target host. A step in the plan may alternatively be a re-allocate step to re-allocate the resource distribution between VMs on some host, or a create step to create one or more VMs on a target host. Or, a step may be a remove step to destroy one or more VMs.

In one embodiment, the POR executes placement plans using the platform interface and interacting with the domain handlers 126. A user or systems management entity may access the placement system 120 using the public interface. The public interface is an external interface for getting placement services and exploiting both the computation and execution capabilities of the placement system 120. The public interface may include methods to deploy new VMs, optimize the current placement, or evacuate hosts. All such methods may have a compute-only version (i.e., the method computes and returns a valid placement) and an execute-only version (i.e., the method validates a placement and then executes a previously computed placement).

In one embodiment, a method is available to validate the correctness of any previously computed placement. In the execute-only methods, a provided placement may be automatically validated prior to execution. Another method may also provide quantitative metrics for a given placement. Exemplary methods provided by the public interface include:

CreateNewVMs—Create new VMs according to requested resources, at optimized placement. The optimized new placement which includes the new VMs might involve shuffle of existing VMs.

EvacuateHosts—Evacuate all VMs from the given hosts. This method might be used in support of responding to a predicted failure, an actual failure, or a maintenance window. The new placement may involve a shuffle to accommodate the evacuated VMs.

Optimizeplacement—Shuffle the VMs to arrive at a better/optimized placement. This method might be used as part of dynamic optimization of cloud resources.

Validateplacement—Validate that an offered placement meets hard constraints from all domain advisors, and optionally provide detailed diagnostics for those not met.

getplacementMetrics—Compute quantitative and/or qualitative metrics on the quality of the provided placement which may be either domain-specific or domain-independent.

In the following, the operations related to placement computation, validation and execution are discussed in further detail. When a new placement computation is proposed (e.g., according to the public interface), the POR collects the environment from the platform interface and the advice (e.g., constraints and goals) from each registered domain advisor, and coalesce them. The POR then calls the analytic engine, providing the coalesced advices, to compute the new desired placement.

When actual execution is needed for getting into a new placement, the POR computes a feasible placement plan to get to the desired placement from the current placement. The POR then executes the placement plan. Before and after each step the POR communicates with each registered handler, to let it apply operations related to its domain. For example, the network domain handler might need to maintain virtual connectivity of VMs after relocation.

The execution of a step in the placement plan (e.g., VM relocation, VM creation, host resource re-allocation) may be performed by the POR using a platform interface that enables such operations on the corresponding hosts or hypervisors. In one embodiment, this platform interface is also available for the domain handlers for querying or applying configurations, but the domain handlers may also use their own interface into the hosts.

A placement validation may occur on the validate placement in a public interface call or for any execution-only call on the public interface (i.e., where the desired new placement is provided on the call). Similar to placement computation, the POR collects the constraints and goals from each registered domain advisor and merges them. It then calls the analytic engine 124, providing the coalesced advices and the provided placement to validate it.

The advisor interface allows a domain advisor 122 to provide independent advice. Advice comprises constraints (i.e., predicates that evaluate a placement to either TRUE or FALSE) and preferences/goals (i.e., expressions that evaluate a placement to a score value). The advice generated by domain advisors 122 may be in various types and formats. Some exemplary advise types and formats are provided below:

ResourceDemandAdvice—the resource requirement of a VM in terms of resource (CPU, RAM, DASD, NETWORK, SLOTS, other)

ResidualCapacityAdvice—allow a specific-size margin of a specific resource to be reserved on hosts VirtualEntityLocationAdvice—the allowed/recommended/forbidden assignment of one or more VMs to host(s)

VirtualEntityCollocationAdvice—the allowed/recommended/forbidden collocation of VMs on the same hosts in the cloud PhysicalEntityPreference—a VM-independent measurement of the desirability of a specific host as a placement target from the perspective of a given advisor FrozenPhysicalEntityAdvice—lock a host to prevent placement of new VMs on it (i.e., VMs that were not already placed on that host)

Locked VirtualEntityAdvice—lock VM to prevent its placement from being manipulated in any way by the placement system Domain advisors 122 may be independently developed and use monitoring information that may not be identical (e.g., in timeliness or interpretation). As such, advice received from the domain advisors 122 may be conflicting. Conflicting advice is resolved through a coalescence process based on a policy that, for example, applies a partial ordering as to the level of priority or hierarchy among the domain advisors 122. The coalescence process takes as input the related advice elements from the domain advisors 122, along with the partial ordering or other related policies, and generates a merged set of generated or included advice elements that are non-conflicting.

The coalescence process is configured to manage the following: (1) the constraints from the advisors are satisfied, (2) non-conflicting advice elements are considered for placement, (3) advice elements that are conflicting are coalesced to remove advice from lower priority placement advisors. The result of the coalescence process is called the coalesced advice repository and comprises a non-conflicting set of advice elements that reflect the concerns of all relevant placement advisors.

The handler interface allows each domain handler to apply an operation before, after and/or during placement plan execution. An example operation is a network configuration by a network domain handler before or after a VM relocation step to assure some connectivity requirement is met. The purpose of the interface is to provide the hooks for the domain handler at all possible points of placement plan execution, as well as a common knowledge on the results. Some exemplary methods are:

preplacementPlan—Called before the placement plan execution.

postplacementPlan—Called after the placement plan execution.

planResult—Called after the postplacementPlan was called on all the domain handlers. Used to notify all domain handlers on the final execution result of the plan, including the success status returned by each of the domain handlers on the postplacementPlan call.

preplacementStep—Called before each placement plan step.

postplacementStep—Called after each placement plan step. The domain handler can return a code that will cause the abortion of the Placeman-Plan execution.

stepResult—Called after each step—and after the postplacementStep was called on all the domain handlers. Used to notify all domain handlers on the final execution result of the step, including the success status returned by each of the domain handlers on the postplacementStep call.

The platform interface is assumed to be provided to the placement system for communication with the real hosts/hypervisors. It enables reading necessary information on the hosts and VMs (as resource capacity, actual usage, current placement etc.) and applying operations such as:

CreateVM: Create a VM on a specified host, with specified resource allocations.

RelocateVM: Relocate a VM from a specified source host to a specified target host.

ReAllocateVM: Reallocate resource for specified VMs on a specified host.

The analytical engine is responsible for calculating an approximate solution to the NP-complete problem of optimally allocating multidimensional resources into multidimensional bins, subject to arbitrary constraints as expressed by the coalesced advice described above. A preferred embodiment of the analytical engine may be a multidimensional bin packing program such as the IBM® WebSphere VESPA optimization engine.

An analytical engine interface may be provided in one embodiment to help analytical engine 124 operate in different environments and for different usages. Optionally, the placement system 120 supports the easy replacement of one analytical engine with another. For example, one implementation of the analytical engine may excel in generating placements that optimize a single scalar utility function, others may generate placements that optimize a set of vector parameters and run more quickly, and yet others may exist that generate placements that optimize not only VM placement, but also inter-VM latency, or bandwidth from VM to disk.

According to one or more embodiments, an analytical engine interface may be provided that allows the placement services to be updated with the analytical engine that is most appropriate for the problem at hand. In one embodiment, replacement of one analytical engine (e.g., VESPA) with another (e.g., Binpacker) may be accomplished via a command line argument. In such embodiment, the desired analytical engine may be selected with a single command line argument such as that provided below which indicates that the VM websrv3 is to be placed using the BINPACK algorithm, for example:

```
Java-Djava.util.logging.config.file=$LOGCONFIG-
    classpath $CLASSPATH com.ibm.vrps.com-
    mand.VRPS-mgrid CAPPERFMGRID-domarg
    domarg-priority 0-command place-engine BIN-
    PACK-veList websrv3
```

In one embodiment, the following exemplary command line may be used to indicate that VM websrv3 is to be placed using the VESPA utility function optimization algorithm, for example:

```
Java-Djava.util.logging.config.file=$LOGCONFIG-
    classpath $CLASSPATH com.ibm.vrps.com-
    mand.VRPS-mgrid CAPPERFMGRID-domarg
    domarg-priority 0-command place-engine
    VESPA-veList websrv3
```

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
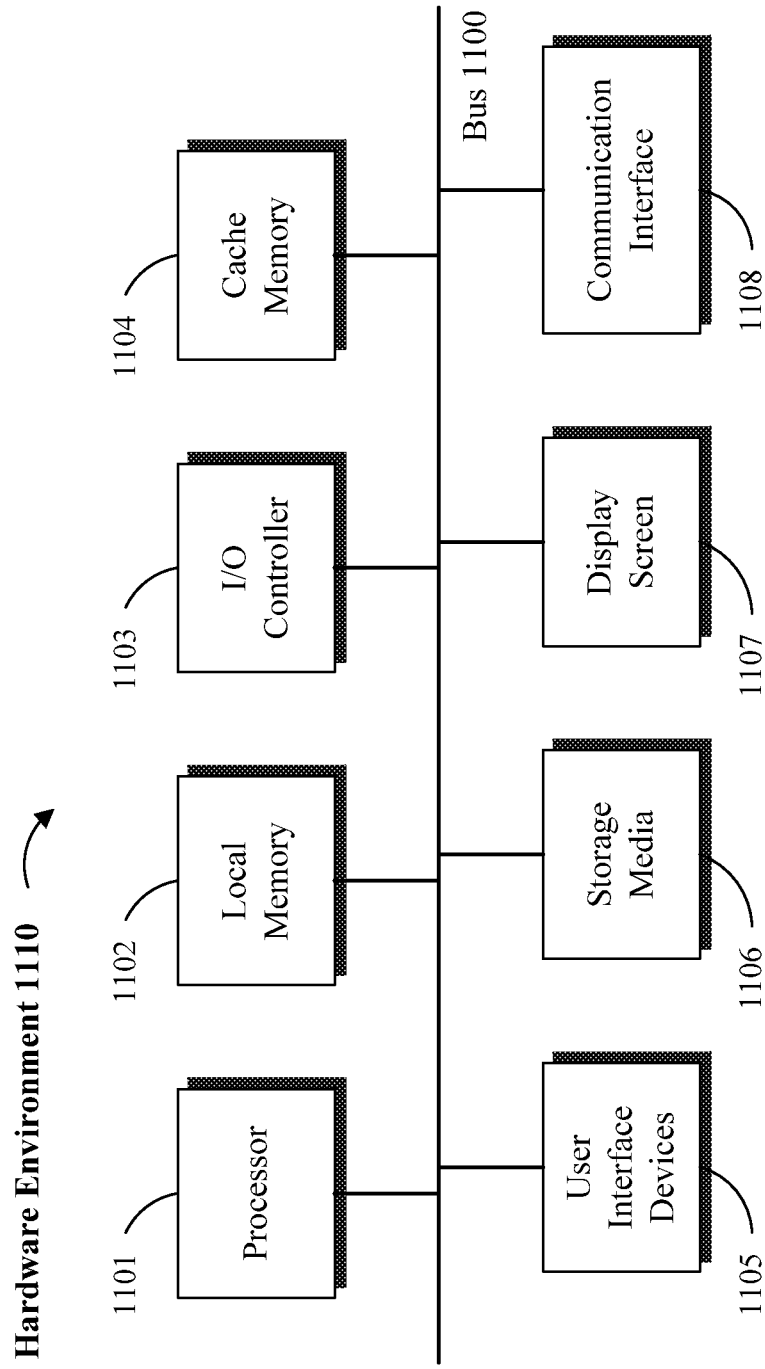
FIGS. 4A and 4B are block diagrams of hardware and software environments in which the disclosed systems and methods may operate, in accordance with one or more embodiments.
Figure 4B:
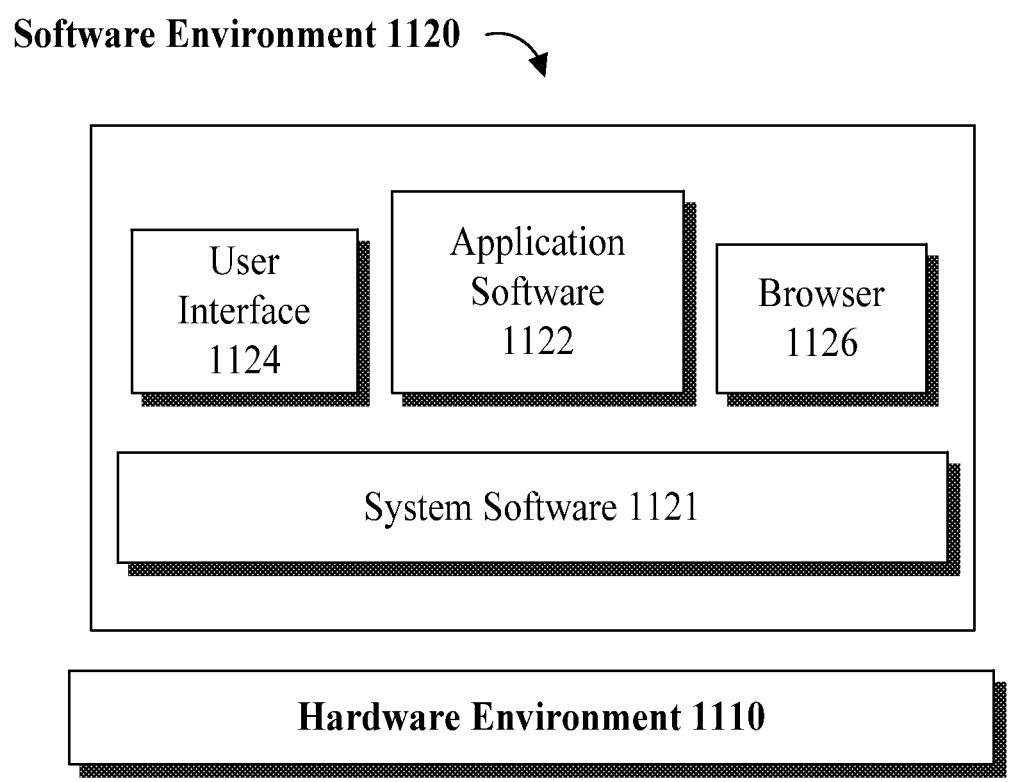

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

As noted earlier, certain embodiments may be implemented in a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Using the on-demand self-service, a cloud consumer may unilaterally provision computing capabilities, such as server time and network storage, as needed automatically without requiring human interaction with the service's provider. Broad network access capabilities may be available over a network and accessed through standard mechanisms that promote use by heterogeneous thin or thick client platforms (e.g., mobile phones, laptops, and PDAs).

Resource pooling allows the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity capabilities may be rapidly and elastically provisioned, in some cases automatically, to quickly scale out and rapidly released to quickly scale in. To the consumer, the capabilities available for provisioning often appear to be unlimited and may be purchased in any quantity at any time. Measured service allows cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Several service models are available, depending on implementation. Software as a Service (SaaS) provides the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) provides the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) provides the capability to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Several deployment models may be provided. A private cloud provides a cloud infrastructure that is operated solely for an organization. It may be managed by the organization or a third party and may exist on-premises or off-premises. A community cloud provides a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud may provide a cloud infrastructure that is made available to the general public or a large industry group and is owned by an organization selling cloud services. A hybrid cloud provides a cloud infrastructure that is a composition of two or more clouds (private, community, or public) that remain unique entities but are bound together by standardized or proprietary technology that enables data and application portability (e.g., cloud bursting for load-balancing between clouds).

Figure 5A:
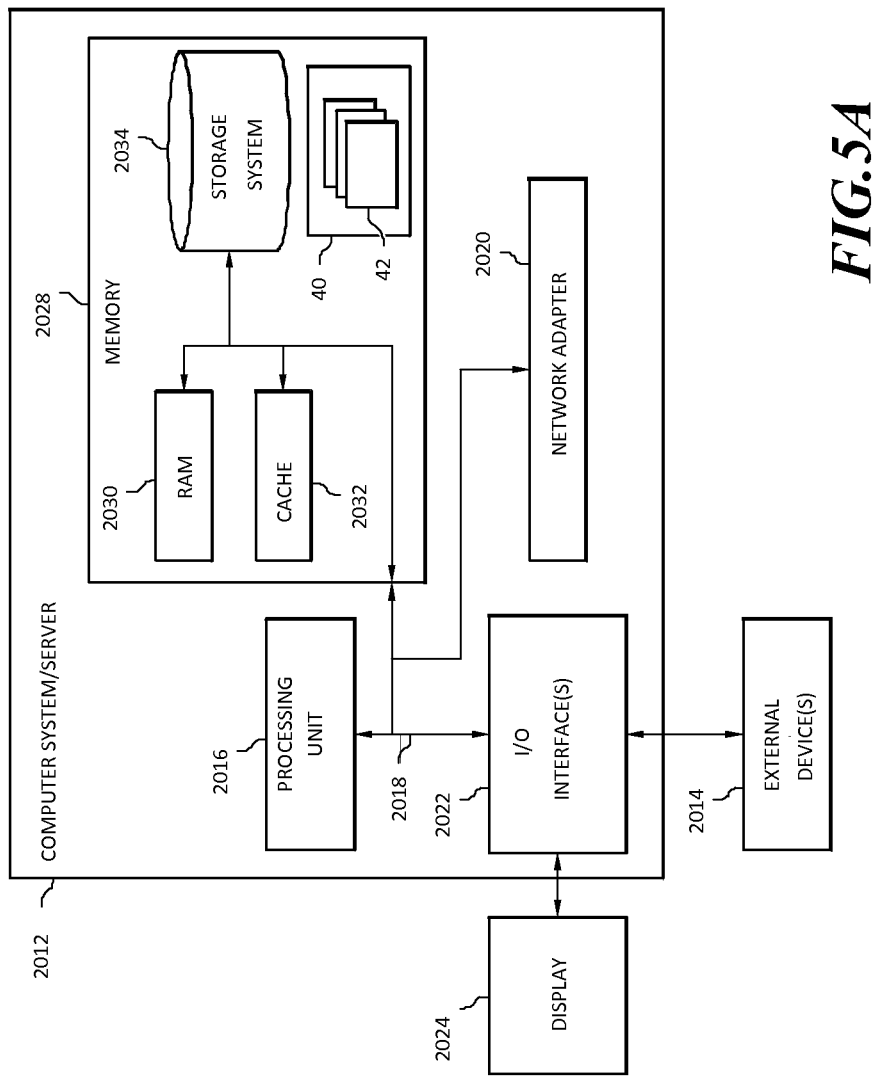
FIG. 5A depicts a cloud computing node according to one embodiment.

A cloud computing environment is service oriented with a focus on statelessness, low coupling, modularity, and semantic interoperability. At the heart of cloud computing is an infrastructure comprising a network of interconnected nodes. Referring now to FIG. 5A, a schematic of an example of a cloud computing node is shown. Cloud computing node 2010 is one example of a suitable cloud computing node and is not intended to suggest any limitation as to the scope of use or functionality of embodiments described herein. Regardless, cloud computing node 2010 is capable of being implemented and/or performing any of the functionality set forth hereinabove.

In cloud computing node 2010, there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5A, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2012 typically includes a variety of computer system readable media. Such media may be any available media that is accessible by computer system/server 2012, and it includes both volatile and non-volatile media, removable and non-removable media. System memory 2028 may include computer system readable media in the form of volatile memory, such as random access memory (RAM) 30 and/or cache memory 32.

Computer system/server 2012 may further include other removable/non-removable, volatile/non-volatile computer system storage media. By way of example, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided.

In some instances, the above components may be connected to bus 2018 by one or more data media interfaces. As will be further depicted and described below, memory 2028 may include at least one program product having a set (e.g., at least one) of program modules that are configured to carry out the functions of one or more embodiments.

Program/utility 2040, having a set (at least one) of program modules 42, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication may occur via I/O interfaces 2022. Still yet, computer system/server 2012 may communicate with one or more networks such as a local area network (LAN), a general wide area network (WAN), and/or a public network (e.g., the Internet) via network adapter 2020.

As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Figure 5B:
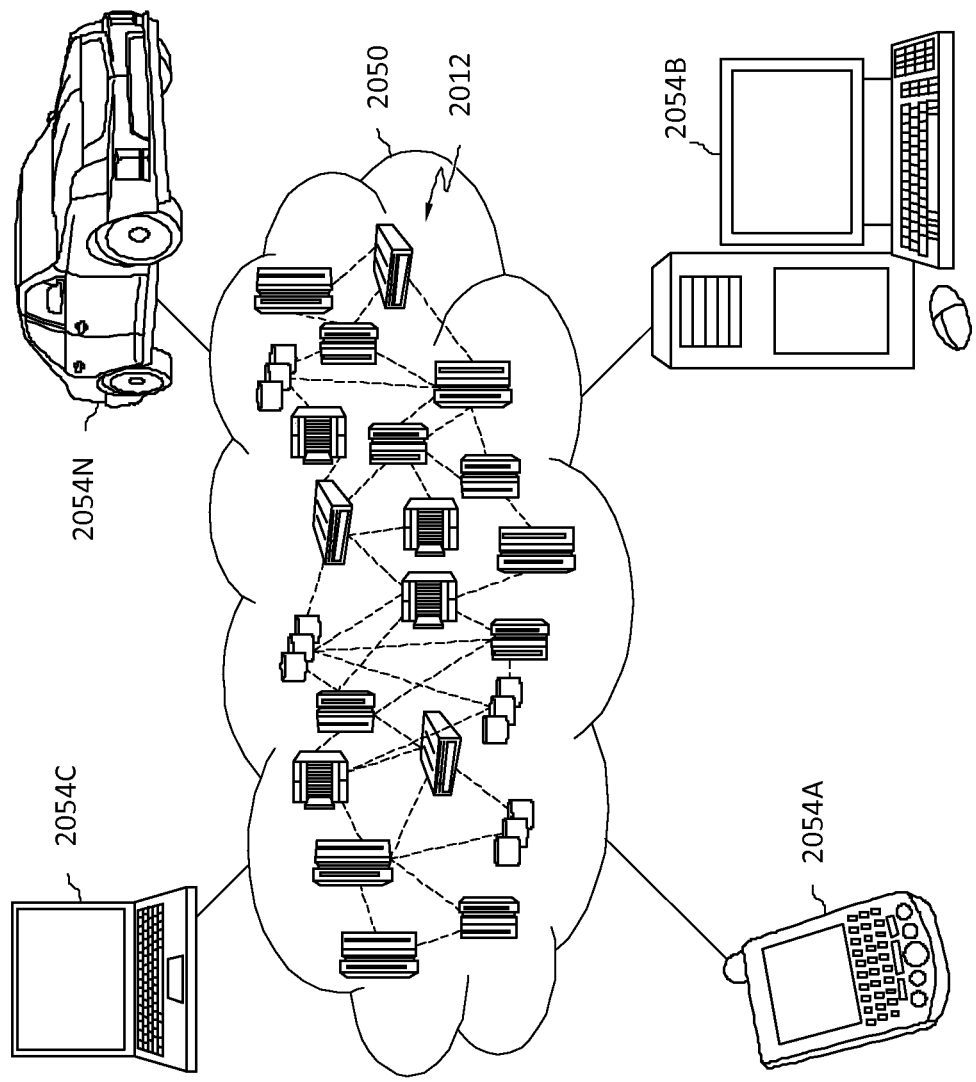
FIG. 5B depicts a cloud computing environment according to one embodiment.

Referring now to FIG. 5B, illustrative cloud computing environment 2050 is depicted. As shown, cloud computing environment 2050 comprises one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate.

Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device.

It is understood that the types of computing devices 54A-N shown in FIG. 5B are intended to be illustrative only and that computing nodes 2010 and cloud computing environment 2050 may communicate with any type of computerized device over any type of network and/or network addressable connection (e.g., using a web browser).

Figure 5C:
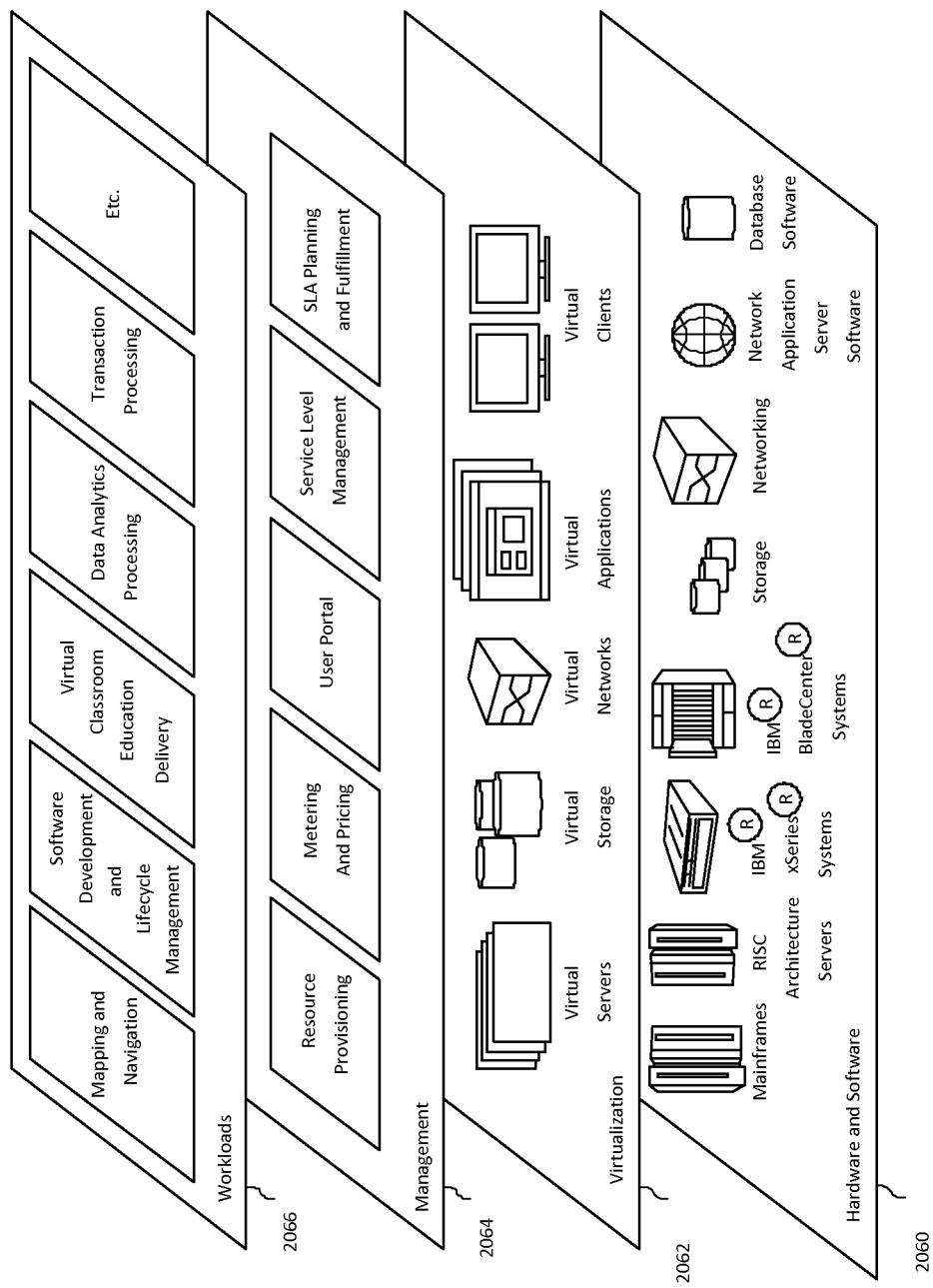
FIG. 5C depicts abstraction model layers according to one embodiment.

Referring now to FIG. 5C, a set of functional abstraction layers provided by cloud computing environment 2050 (FIG. 5B) is shown. It should be understood in advance that the components, layers, and functions shown in FIG. 5C are intended to be illustrative of one or more embodiments and are not limited thereto. As depicted, the following layers and corresponding functions are provided.

Hardware and software layer 2060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2062 provides an abstraction layer from which the following examples of virtual entities may be provided: virtual servers; virtual storage; virtual networks, including virtual private networks; virtual applications and operating systems; and virtual clients. In one example, management layer 2064 may provide the functions described below. Resource provisioning provides dynamic procurement of computing resources and other resources that are utilized to perform tasks within the cloud computing environment.

Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met.

Service Level Agreement (SLA) planning and fulfillment provide pre-arrangement for, and procurement of, cloud computing resources for which a future requirement is anticipated in accordance with an SLA. Workloads layer 2066 provides examples of functionality for which the cloud computing environment may be utilized. Examples of workloads and functions which may be provided from this layer include: mapping and navigation; software development and lifecycle management; virtual classroom education delivery; data analytics processing; transaction processing; etc.

What is claimed is:

1. A domain management method for a virtualized computing environment, the method comprising:
   receiving, from at least a first domain advisor, a first set of placement constraints for a first domain monitored by the first domain advisor;
   receiving, from at least a second domain advisor, a second set of placement constraints for a second domain monitored by the second domain advisor,
   wherein the first domain is associated with a first system management domain related to at least one of performance, availability, security, financial or administrative domains in the virtualized computing environment, and wherein the second domain is associated with a second system management domain related to at least one of performance, availability, security, financial and administrative domains in the virtualized computing environment, and wherein the first system management domain is exclusive of the second system management domain;

collating advice received from two or more domain advisors connected in the virtualized computing environment, wherein the collating comprises:

selecting a first advice element for inclusion in a placement plan, wherein said advice element was received at the time T1 from a first domain advisor and at the time T1 the first advice element was non-conflicting with other advice elements in the placement plan; and deselecting the first advice element for inclusion in the placement plan, in favor of a second advice element received at the time T2, if the second advice element is conflicting with the first advice element, and is received from a second domain advisors that is higher in rank than the first domain advisor;

resolving any conflicts among the advice received from said one or more domain advisors;

generating the placement plan based on reconciled advice generated by resolving conflicts identified in the advice received from the domain advisors, wherein the placement plan comprises a plurality of operations for virtual machines in said virtualized computing environment; and executing the one or more operations in the placement plan, wherein one or more domain handlers may be called to update the virtualized computing environment before, during or after execution of one or more operations from among said plurality of operations in the plan.

2. The method of claim 1, wherein the conflicts are resolved according to a predefined policy which designates the two or more domain advisors in a hierarchical order, wherein the hierarchical order defines an order of importance to the two or more domain advisors so that advice provided by the first domain advisor designated at a first level of importance overrides advice provided by the second domain advisor at a second level of importance in the hierarchical order.

3. The method of claim 2, wherein an advice received from a domain advisor in a higher rank in the hierarchical order overrides an advice received from a domain advisor in a lower rank, in case of a conflict.

4. The method of claim 1, wherein the first advice received from the first domain advisor about optimizing attributes associated with the first system management domain at least in part conflicts with the second advice received from the second domain advisor about optimizing attributes associated with the second system management domain.

5. The method of claim 1, wherein the placement plan is generated based on the set of placement constraints identified in the advice received from the two or more domain advisors.

6. The method of claim 1, wherein the placement plan is generated based on optimization goals identified in the advice received from the domain advisors.

7. The method of claim 1, wherein a user or a systems management entity may manipulate the placement plan using a public interface that allows access to computation and execution capabilities of a placement system utilized to generate the placement plan.

8. The method of claim 1, wherein the placement plan is validated prior to execution by an analytical engine, and an interface is provided to allow the placement plan to be validated using an analytical engine.

9. A domain management system for a virtualized computing environment, the system comprising:

one or more processors;

a logic unit for collating advice received from one or more domain advisors connected in the virtualized computing environment, a logic unit for receiving, from at least a first domain advisor, a first set of placement constraints for a first domain monitored by the first domain advisor;

a logic unit for receiving, from a second domain advisor, a second set of placement constraints for a second domain monitored by the second domain advisor, wherein the first domain is associated with a first system management domain related to at least one of performance, availability, security, financial or administrative domains in the virtualized computing environment, and wherein the second domain is associated with a second system management domain related to at least one of performance, availability, security, financial and administrative domains in the virtualized computing environment, and wherein the first system management domain is exclusive of the second system management domain;

a logic unit for collating advice received from two or more domain advisors connected in the virtualized computing environment, wherein the collating comprises:

selecting a first advice element for inclusion in a placement plan, wherein said advice element was received at the time T1 from a first domain advisor and at the time T1 the first advice element was non-conflicting with other advice elements in the placement plan; and deselecting the first advice element for inclusion in the placement plan, in favor of a second advice element received at the time T2, if the second advice element is conflicting with the first advice element, and is received from a second domain advisors that is higher in rank than the first domain advisor;

a logic unit for resolving any conflicts among the advice received from said one or more domain advisors;

a logic unit for generating the placement plan based on reconciled advice generated by resolving conflicts identified in the advice received from the domain advisors, wherein the placement plan comprises a plurality of operations for virtual machines in said virtualized computing environment; and a logic unit for executing the one or more operations in the placement plan, wherein one or more domain handlers may be called to update the virtualized computing environment before, during or after execution of one or more operations from among said plurality of operations in the plan.

10. The system of claim 9, wherein the conflicts are resolved according to a predefined policy which designates the two or more domain advisors in a hierarchical order, wherein the hierarchical order defines an order of importance to the two or more domain advisors so that advice provided by the first domain advisor designated at a first level of importance overrides advice provided by the second domain advisor at a second level of importance in the hierarchical order.

11. The system of claim 10, wherein an advice received from a domain advisor in a higher rank in the hierarchical order overrides an advice received from a domain advisor in a lower rank, in case of a conflict.

12. The system of claim 9, wherein the first advice received from the first domain advisor about optimizing attributes associated with the first system management domain at least in part conflicts with the second advice received from the second domain advisor about optimizing attributes associated with the second system management domain.

13. The system of claim 9, wherein the placement plan is generated based on the set of placement constraints identified in the advice received from the two or more domain advisors.

14. The system of claim 9, wherein the placement plan is generated based on optimization goals identified in the advice received from the domain advisors.

15. A computer program product comprising a non-transitory computer readable storage medium having a computer readable program, wherein the computer readable program when executed on a computer causes the computer to:
- receive, from at least a first domain advisor, a first set of placement constraints for a first domain monitored by the first domain advisor,
- receive, from at least a second domain advisor, a second set of placement constraints for a second domain monitored by the second domain advisor,
- wherein the first domain is associated with a first system management domain related to at least one of performance, availability, security, financial or administrative domains in the virtualized computing environment, and
- wherein the second domain is associated with a second system management domain related to at least one of performance, availability, security, financial and administrative domains in the virtualized computing environment, and
- wherein the first system management domain is exclusive of the second system management domain;
- collate advice received from two or more domain advisors connected in the virtualized computing environment, wherein the collating comprises,
  - selecting the first advice for inclusion in a placement plan, wherein the first advice was received at a time T1 from the first domain advisor, and at the time T1 the first advice was non-conflicting with other advice in the placement plan; and
  - deselecting the first advice for inclusion in the placement plan in favor of the second advice received at a time T2, if the second advice conflicts with the first advice and is received from the second domain advisor of a higher rank than the first domain advisor;
- resolving any conflicts among the advice received from said one or more domain advisors;
- generating the placement plan based on reconciled advice generated by resolving conflicts identified in the advice received from the domain advisors, wherein the placement plan comprises a plurality of operations for virtual machines in said virtualized computing environment; and
- execute the one or more operations in the placement plan, wherein one or more domain handlers may be called to update the virtualized computing environment before, during or after execution of one or more operations from among said plurality of operations in the plan.

16. The computer program product of claim 15, wherein the conflicts are resolved according to a predefined policy which designates the two or more domain advisors in a hierarchical order, wherein the hierarchical order defines an order of importance to the two or more domain advisors so that advice provided by the first domain advisor designated at a first level of importance overrides advice provided by the second domain advisor at a second level of importance in the hierarchical order.

17. The computer program product of claim 16, wherein an advice received from a domain advisor in a higher rank in the hierarchical order overrides an advice received from a domain advisor in a lower rank, in case of a conflict.

18. The computer program product of claim 15, wherein the first advice received from the first domain advisor about optimizing attributes associated with the first system management domain at least in part conflicts with the second advice received from the second domain advisor about optimizing attributes associated with the second system management domain.

19. The computer program product of claim 15, wherein the placement plan is generated based on the set of placement constraints identified in the advice received from the two or more domain advisors.

20. The computer program product of claim 15, wherein the placement plan is generated based on optimization goals identified in the advice received from the domain advisors.

* * * * *